Aug. 12, 1969  E. G. ROGGENBURK  3,460,437
ROTARY FLUID DISPLACEMENT MACHINE WITH UNITARY END
PLATE AND BEARING CONSTRUCTION
Filed Jan. 3, 1967  2 Sheets-Sheet 1
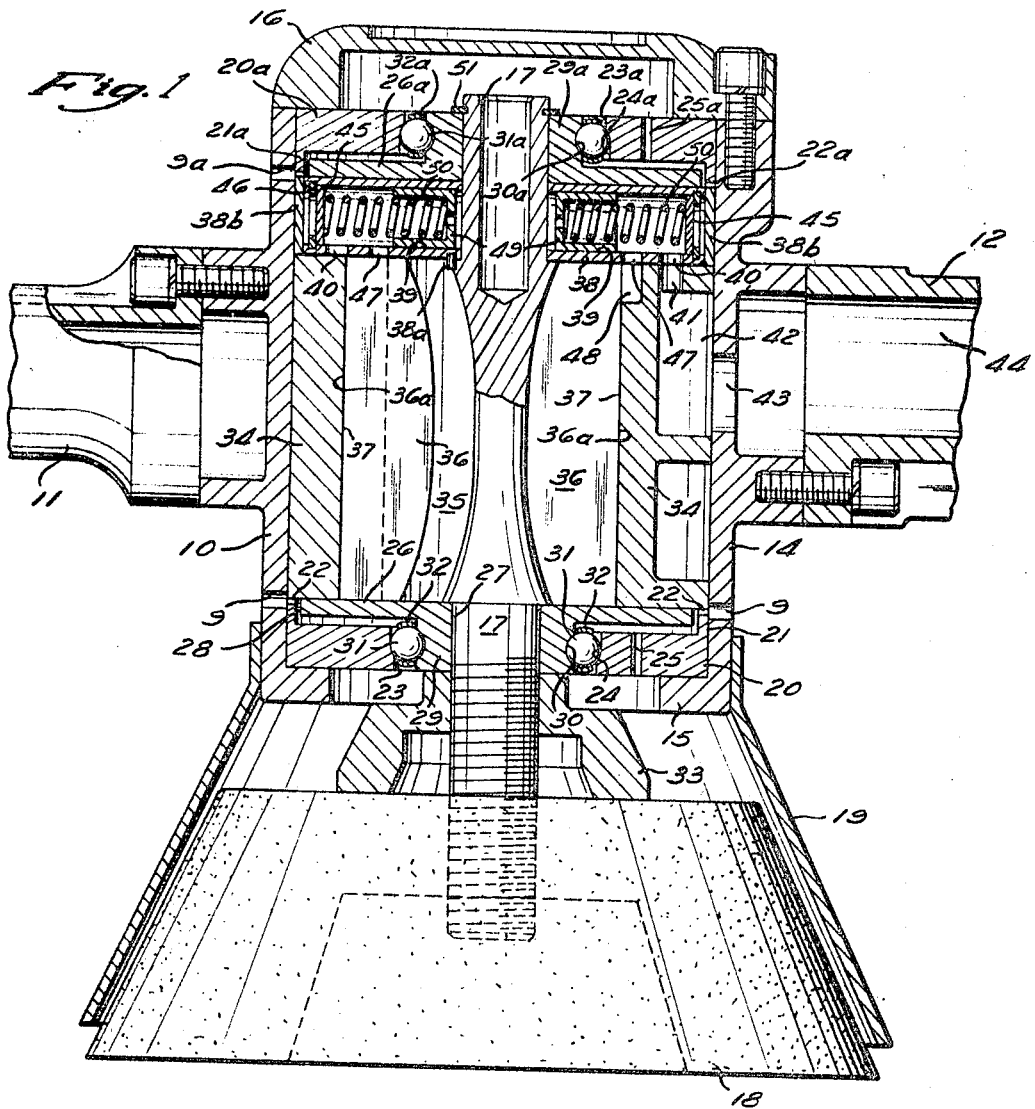
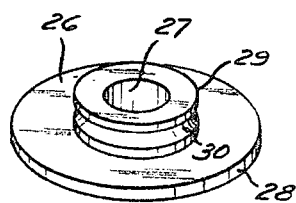
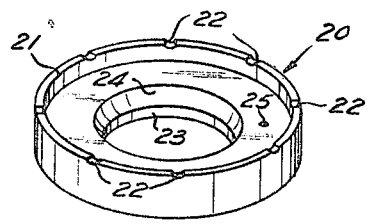
INVENTOR.
EARL G. ROGGENBURK
BY
Ely, Golrick & Flynn
ATTORNEYS United States Patent Office 3,460,437
Patented Aug. 12, 1969

3,460,437
ROTARY FLUID DISPLACEMENT MACHINE WITH UNITARY END PLATE AND BEARING CONSTRUCTION
Earl G. Roggenburk, 4120 Behrwald Ave., Cleveland, Ohio 44109
Continuation-in-part of application Ser. No. 419,799, Dec. 21, 1964. This application Jan. 3, 1967, Ser. No. 606,720
Int. Cl. F01c 1/00, 21/12; F16c 19/14
U.S. Cl. 91—58   2 Claims

ABSTRACT OF THE DISCLOSURE

A rotary fluid displacement machine, such as an air motor or a pump, having a rotatable end plate at each end of the rotor which is attached to the inner race of the anti-friction bearing there. An annular spacer extends around the periphery of the end plate and is engaged axially between the outer race of the anti-friction member and a stationary liner which receives the rotor.

---

This application is a continuation-in-part of my co-pending U.S. patent application, Ser. No. 419,799, filed Dec. 21, 1964, now abandoned.

This invention relates to a rotary fluid displacement machine, particularly an air motor, having a unitary ball bearing and end plate construction for rotatably supporting and locating the rotor and also for sealing the pressurized interior of the machine, and an annular spacer associated in a novel manner with the ball bearing and end plate construction.

In pressure fluid-operated rotary motors for driving various tools, such as grinders, the conventional practice has been to provide a non-rotating end plate at each axial end of the rotor. Commonly, the rotor has a plurality of circumferentially spaced, radially disposed vanes which revolve with the rotor and slide in and out radially to displace fluid, such as air. In addition, such motors have ball bearings, located axially outboard from these end plates, to support the rotor for rotation. U.S. Patent 2,326,396 to Schaedler exemplifies such motor constructions.

One serious disadvantage of such motor constructions has been the tendency for excessive scoring or wear on the inner faces of these end plates caused by the abutting axial ends of the vanes, which revolve across these faces due to the rotation of the rotor. Such wear can proceed to the point where the end plates no longer provide the desired fluid seals for the motor.

Another serious disadvantage of such prior motor constructions has been the difficulty and expense of providing the proper concentricities between the end plates and the motor housing, and between the ball bearings and either the end plates or the motor housing.

The present invention is directed to a rotary fluid displacement machine having a unitary end plate and bearing construction and an annular spacer associated therewith which overcome all of these disadvantages and difficulties. In accordance with the present invention, the end plate is attached to the inner race of the ball bearing so that it rotates in unison with the rotor, and an annular spacer is engaged axially between a stationary liner for the rotor and the outer race of the ball bearing to properly locate the rotating parts of the machine.

Accordingly, it is a principal object of this invention to provide a rotary fluid displacement machine having a novel assembly of a unitary end plate and bearing construction and an annular spacer for the outer race of the bearing.

Another object of this invention is to provide a novel assembly of a unitary end plate and bearing construction and an annular spacer for a rotary fluid displacement machine which is more compact and less expensive to assemble in the machine than the previous arrangements which embodied separate end plates and bearings.

Further objects and advantages of this invention will be apparent from the following detailed description of certain presently-preferred embodiments thereof which are shown in the accompanying drawings.

In the drawings:

FIGURE 1 is an axial section through an air motor having a unitary end plate and bearing construction therein and arranged to drive a grinder;

FIGURE 2 is a perspective view of the end plate and inner race member in the FIG. 1 motor, viewed from its axially outward side;

FIGURE 3 is a perspective view of the outer bearing race member in the FIG. 1 motor, viewed from its axially inward side;

Figure 5:
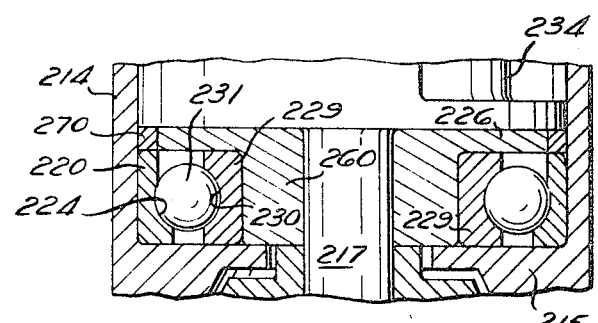
FIGURE 5 is a fragmentary axial section showing the present assembly of the annular spacer and the unitary end plate and bearing construction.

Referring first to FIG. 1, the air motor shown therein may be substantially similar to that disclosed in my U.S. Letters Patent No. 3,054,389, issued Sept. 18, 1962. This air motor constitutes an environment for the novel assembly of the unitary bearing and end plate and the annular spacer therefor in accordance with the present invention, the preferred embodiment of which is illustrated in FIG. 5. It comprises a stationary housing 10 having oppositely disposed handles 11 and 12. Handle 12 is hollow and is provided with an on-off valve (not shown) for selectively admitting air under pressure to the interior of the housing 10.

The housing 10 has a cylindrical side wall 14 terminating at its lower end in an inturned, horizontal, annular flange 15 of short radial extent. A cover plate 16 is bolted to the upper end of the housing side wall 14.

A rotor shaft 17 is rotatably mounted in the housing 10. The lower end of this shaft is screw-threaded for the attachment of a grinding disk 18, spaced below the housing 10. The housing carries a depending annular skirt 19 which extends around the grinding disk and acts as a shield for it.

A unitary end plate and ball bearing construction is disposed inside the housing 10 directly above the bottom flange 15 on the latter. This end plate and bearing construction comprises an annular outer bearing race member 20 (FIG. 3) resting on the housing flange 15, as shown in FIG. 1, and snugly engaging the inside of the housing side wall 14. Thus, the inside of the housing wall 14 defines the radial position of the outer race 20, and the bottom flange 15 on the housing defines the position of the outer race axially with respect to the housing. The outer race 20 has an upstanding, peripheral, annular flange 21 which at its upper edge has a plurality of circumferentially spaced transverse passages in the form of radial grooves 22, as best seen in FIG. 3. These grooves register with openings 9 in the housing side wall 14. The outer race 20 has a circular central opening 23 and at this opening, it presents an annular, radially inwardly facing groove 24, which is open at the top. The outer race 20 also has a longitudinal vent opening 25.

The end plate and bearing construction also includes an annular inner end plate 26 (FIG. 2) disposed axially inward from the outer bearing race 20, as shown in FIG.

1. End plate 26 has a circular central opening 27, which snugly receives the motor shaft 17, so that the end plate will rotate in unison with shaft 17. The end plate 26 extends horizontally radially outward from this opening 27 in closely spaced, confronting relationship to the outer race 20 and terminates at a circular peripheral edge 28, which is closely spaced radially inward from the peripheral flange 21 on the outer race 20. The axially inward face of the end plate 26 is substantially coplanar with the axially inward end of the flange 21 on the outer race 20.

The bearing has an annular inner race 29 which, in this particular embodiment, is formed integrally of one piece with the end plate 26 and extends downward from the latter and radially inward from the outer race 20. This inner race 29 snugly receives the motor shaft 17. The inner race 29 has a radially outwardly facing annular groove 30 in its outer periphery in confronting relationship to the inwardly facing groove 24 in the outer race member 20.

A plurality of rolling anti-friction members, here shown as balls 31, are rotatably engaged between the outer and inner races with their radially inward ends received in the external groove 30 in the inner race 29 and their radially outward ends received in the internal groove 24 in the outer face 20. These balls are carried by an annular cage 32, which is loosely disposed radially between the grooves 30 and 24.

The lower end of the inner race 29 is engaged by an end cap 33, which is threaded onto shaft 17 directly above the grinding disk 18.

A stationary eccentric liner 34 is mounted within the housing directly above the end plate 26, with a close running clearance between them to minimize the leakage of pressurized air from the interior of the motor.

Directly above the end plate 26, a rotary mechanism, which includes a fluid-displacing rotor 35, is secured to the shaft 17 within the eccentric liner 34. This rotor has a plurality of lateral or transverse slots in which vanes 36 are slidable. The vanes are thrown outward by centrifugal force as the rotor 35 rotates and their radially outer edges 36a sealingly slide over the inside wall 37 of the eccentric liner 34. As the rotor 35 rotates off-center with respect to this inside wall of the liner, the vanes move laterally in and out of the slots in the rotor, as well as turning with the rotor. Between each successive pair of vanes 36, the outside of the rotor 35 and the inside of liner 34 define a fluid displacement chamber or pocket which is either expanding or contracting as the rotor turns.

As shown in FIG. 1, the flat inner face of the end plate 26 engages the adjacent axial ends of the rotor body 35 and the slidable vanes thereon across the complete lateral extent of the rotor outward from the shaft 17 to the stationary eccentric liner 34 inside the housing 10. The end plate 26 provides a substantially fluid-tight seal for this end of the rotor, although it will be understood that usually there will be some leakage of pressurized air from the interior of the motor past this seal.

It will be noted that the bottom flange 15 on the housing 10 locates the bearing 20, 29, 31 axially of the housing, and the snug engagement of the outer bearing race 20 with the inside of the housing wall 14 defines the radial position of this bearing which, in turn, defines the radial position of the motor shaft 17 and the rotor 35. The top edge of the peripheral flange 21 on the outer bearing race 20 is engaged by the lower end of the stationary eccentric liner 34 to determine the position of this liner axially of the housing 10. The end plate 26, by its engagement with the lower end of the rotor 35, defines the latter's axial position within the housing 10.

At the upper end of the fluid displacement rotor 35, the rotary mechanism includes an annular valve or governor body 38, which is attached to shaft 17 by a dowel pin 38a. Valve body 38 overlies the rotor vanes 36 and the upper end of the eccentric liner 34, with a close running clearance axially between them. This valve body 38 has a plurality of radial bores 39 therein and respective outer slots 40 in its bottom face, each communicating with a respective bore. A cylindrical liner or spacer 38b at the inside of housing 10 rotatably receives the valve body 38.

The eccentric liner 34 has an opening 41 in its upper end, and the outer slots 40 in the valve body 38 register with this opening individually in succession as the valve body turns in unison with the rotor 35 while the eccentric liner 34 remains stationary. This opening 41 communicates to a chamber 42 formed between the side wall 14 of the housing and the side wall 37 of the eccentric liner 34. The housing has a side opening 43 connecting this chamber 42 to an air inlet passage 44 in the hollow handle 12.

With this arrangement, air under pressure in the handle passage 44 flows into chamber 42 and thence through the opening 41 into the respective individual bores 39 in valve body 38 as the outer slots 40 of these bores register successively with the opening 41.

The radially inward end of each bore 39 in the valve body 38 is sealed by the shaft 17. The outer end of each bore is sealed by an end plug 45 held in place by a snap ring 46.

The valve body 38 also has a plurality of inner slots 47 in its bottom face, each located radially inward from the respective outer slot 40 and communicating with the respective bore 39. These inner slots 47 are positioned to register individually in succession with an air inlet slot 48 in the inside wall of the liner 34 as the rotor 35 turns.

Each bore 39 in the valve body 38 slidably receives a valve member 49 which is biased radially inward by a coil spring 50 engaged under compression between the valve member and the end plug 45 for that bore. When the motor is running at low speed, each valve member 49 will be disposed radially inward past the respective inner slot 47 at that bore 39 in the valve body, permitting air under pressure to flow unrestrictedly through this slot into the air inlet slot 48 in the liner. However, at high speeds each valve member will move radially outward centrifugally to partially block the respective inner slot 47 and thereby reduce the supply of air to the motor for limiting its speed.

An end plate and ball bearing construction identical to that already described in detail is provided just above the valve body 38 which forms part of the rotary mechanism in the present motor. This construction is a mirror image of the construction already described and corresponding elements have the same reference numerals, with an a subscript added. The detailed description of this construction will not be repeated.

The upper end of the outer bearing race 20a in this construction engages the top end plate 16 of the motor housing, and this outer bearing race 20a is snugly received inside the side wall 14 of the housing, so that the housing locates the bearing assembly both axially and radially.

A snap ring 51 on the upper end of shaft 17 holds the integral end plate and inner race structure 26a, 29a abutting against the upper end of the valve body 38 on the rotary mechanism in the motor. This end plate and inner race structure 26a, 29a rotates in unison with the rotor 35 and shaft 17, as well as providing a seal for the upper end of the rotary mechanism in the motor.

The combined axial length of the outer race member 20a in the upper bearing and end plate construction, the liner 38b for the valve body, the eccentric liner 34 for the rotor, and the outer race member 20 in the lower bearing and end plate construction is slightly longer than the interior of housing 10 above the bottom flange 15. Consequently, when the cover plate 16 is bolted down, these parts are rigidly clamped in place and are held against turning.

In the operation of this air motor, air under pressure flows from the handle passage 44 through the opening 41 in the stationary liner and in succession through each respective outer slot 40 into the respective bore 39 in the valve body 38 as the rotor 35 rotates. From each bore 39 in the valve body, the air flows out of the respective inner slot 47 into the inlet slot 48 in the liner 34 into the space between a pair of adjacent vanes 36 carried by the rotor. The force of this entering air, acting on the vanes, causes the rotor 35 to turn eccentrically within the stationary liner 34. After the air has expended its energy in turning the rotor, it is discharged to the atmosphere through appropriately located openings (not shown) in the side wall 37 of the inner liner 34 and through a port (not shown) in the housing 10 which communicates with these openings.

The lower bearing and end plate construction 20–32 and the upper bearing and end plate construction 20a–32a support the shaft 17, rotor 35 and valve body 38 for rotation, as well as positively locating these members radially and axially within the housing 10. Because the end plate 26 is attached to the inner race 29 of the ball bearing the only critical tolerances in the present arrangement are those which are required to provide a close concentric fit of the outer race members 20 and 20a in the cylindrical side wall 14 of the motor housing 10. Once this fit is obtained, it establishes the proper radial positioning of the respective inner race and end plate member 26 or 26a and the motor shaft 17 with respect to the motor housing because the assembler may rely on the great precision with which the balls 31 or 31a and the outer and inner race surfaces 24, 30 and 24a, 30a are manufactured in accordance with the present practices of ball bearing manufacture. with the present practices of ball bearing manufactures. and dimensions for a plurality of separate interfitting parts, which characterize the prior arrangements in which the end plates for the rotor are separate from the ball bearings, are avoided by the unitary bearing and end plate construction of the present invention.

In addition, the radial overlap between the end plate 26 or 26a and the outer race member 20 or 20a in the present construction provides an effective dust seal for each end of the air motor. The air vents 22 and 25 in the lower construction and the corresponding vents 22a and 25a in the upper construction insure that any pressurized air leaking endwise out of the air motor will be discharged through these vents and will not enter the raceways where the bearing balls 31 and 31a run.

Figure 4:
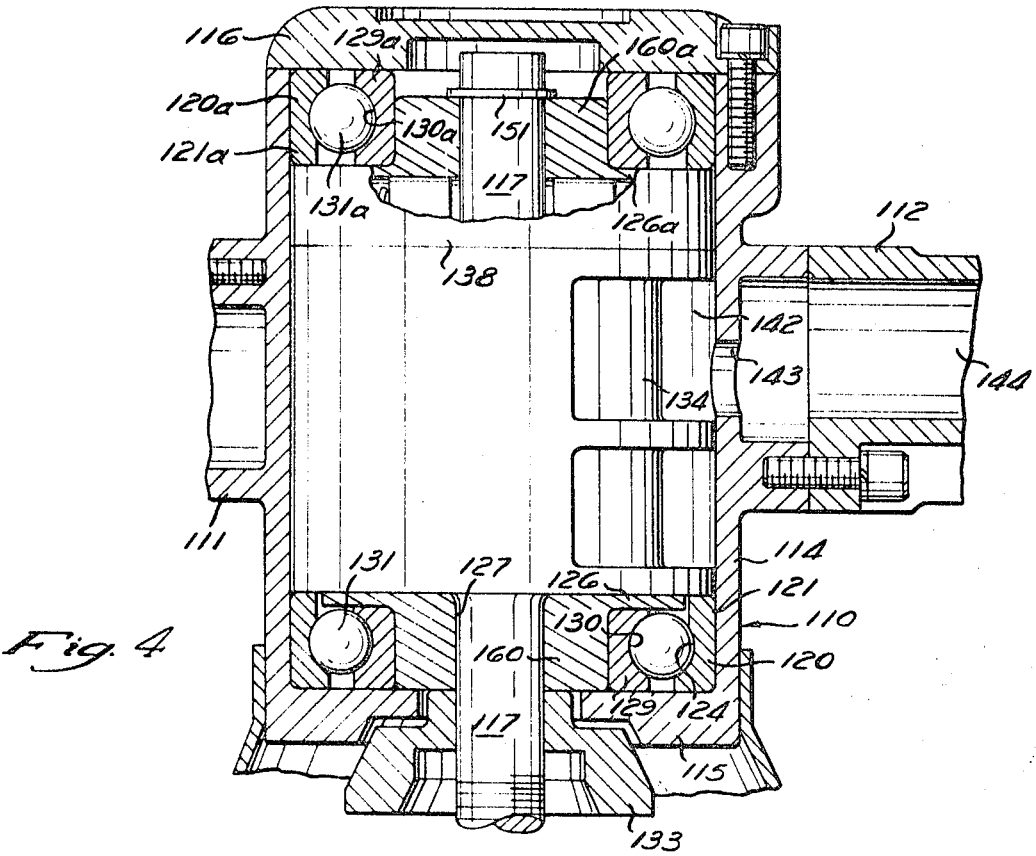
FIGURE 4 is a view similar to FIG. 1 and showing an air motor provided with a second embodiment of the unitary end plate and bearing construction.

FIGURE 4 shows an air motor having at each end of the rotary mechanism a second embodiment of the unitary bearing and end plate construction. The rotary mechanism, including the fluid displacement rotor and the valve, is essentially the same in construction and mode of operation as in FIG. 1, and the description of these parts is unnecessary to repeat. In FIG. 4, corresponding elements are given the same reference numerals, plus 100, as the elements of FIGS. 1–3.

In FIG. 4 the end plate 126 at the lower end of the rotor has an integral, annular, depending hub 160 having a central opening 127 which snugly receives the motor shaft 117. The inner race 129 of the bearing is formed separately from the end plate 126 and it has an interference fit on the outside of the latter's hub 160 so that these parts are connected for rotation in unison with the rotor and the shaft 117.

Both the inner race 129 and the outer race 120 of this lower bearing rest on the inturned bottom flange 115 on the motor housing, so that the housing positively locates this bearing axially. The end plate 126 rests on top of the inner race 129, so that this end plate is also properly located axially of the motor housing. The snug fit of the outer race 120 inside the side wall 114 of the housing defines the radial position of this bearing and end plate assembly and that of the rotor and shaft 117, as well. The outer race 120 has an upstanding peripheral flange 121 whose upper edge is in the same horizontal plane as the inner face of the end plate 126. This upper edge abuts against the eccentric liner 134 of the motor.

At the upper end of the rotary mechanism in the motor, the end plate 126a is formed integral with the valve body 138. That is, end plate 126a provides the top wall of valve body 138. The lower ends of both the outer race 120a and the inner race 129a rest on top of this end plate. In other respects, the upper bearing and end plate construction is essentially similar to the lower one, and a detailed description of it is considered to be unnecessary.

FIGURE 5 shows the lower bearing and end plate construction in accordance with the preferred embodiment of the present invention. This embodiment is essentially the same as that of FIG. 4, with corresponding elements having the same reference numerals, plus 100. The bearing of FIG. 5 differs from that of FIG. 4 in that the outer race 220 has its top edge in the same horizontal plane as the top edge of the inner race 229. In accordance with the present invention, a separate annular spacer 270 is engaged between the eccentric liner 134 of the motor and the top edge of the outer race 220 around the periphery of the end plate 126.

This construction is advantageous from the cost standpoint because the ball bearing itself, comprising the outer race 220, the inner race 229 and the balls 231, is a standard type of ball bearing construction. Also, the bearing (not shown) for the upper end of the motor may be identical to this lower bearing.

Figure 6:
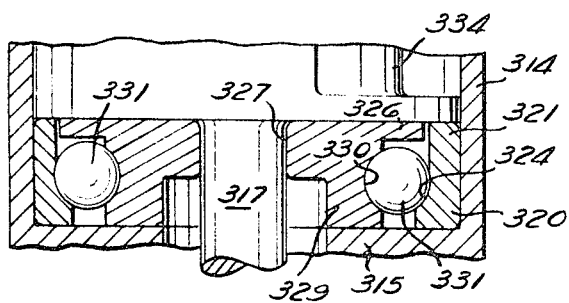
FIGURE 6 is a similar view showing a fourth embodiment of the unitary end plate and bearing construction.

FIGURE 6 shows a fourth embodiment of the lower bearing and end plate construction. Corresponding elements are given the same reference numerals as those in FIG. 1, plus 300. As in FIG. 1, the end plate 326 is integral with the inner race 329.

The principal difference between the FIG. 6 construction and the FIG. 1 construction is that in FIG. 6 the ball races are located appreciably farther outward from the axis of the shaft, so as to reduce the radial thrust on each ball.

This is also true of FIGS. 4 and 5 as compared with the FIG. 1 construction.

While the present assembly of the annular spacer and the unitary bearing and end plate construction has been shown embodied in a particular rotary air motor, it is to be understood that it may also be used on other types of rotary fluid displacement machines, such as rotary steam engines or hydraulic motors or pumps, for example. Also, while a specific presently-preferred embodiment of this assembly has been described in detail and illustrated in the accompanying drawings, it is to be understood that various modifications, omissions and refinements which depart from the disclosed embodiment may be adopted without departing from the spirit and scope of this invention.

I claim:

1. In a rotary fluid displacement machine comprising a housing, a rotary mechanism in the housing including a fluid displacement rotor, and a rotary shaft connected to said rotary mechanism for rotation therewith and extending axially from one end of said rotary mechanism, the improvement which comprises an annular outer bearing race snugly seated in said housing at said one end of the rotary mechanism, an annular inner bearing race located laterally inward from said outer race and passing said shaft, rolling anti-friction members engaged between said outer and inner races, an end plate rigidly connected to said inner race and snugly receiving said shaft for rotation of the end plate and the inner race in unison with said shaft and the rotary mechanism, said end plate extending from said shaft laterally across said rotary mechanism in substantially sealing engagement with the latter, a stationary liner within said housing surrounding said rotary mechanism, said housing having a rigidly attached laterally inwardly extending portion which throughout its complete extent is spaced axially outward from the adjacent end of the liner and which engages the axially outward end of the outer race to position the latter axially of the housing, and a separately formed annular spacer engaging the axially inward end of the outer race and extending around the periphery of said end plate and presenting an inner end face which is substantially coplanar with the axially inward face of said end plate and which engages the adjacent end of said liner.

2. In a rotary fluid displacement machine comprising a housing, a rotary mechanism in the housing including a fluid displacement rotor, and a rotary shaft connected to said rotary mechanism for rotation therewith and extending axially from one end of said rotary mechanism, the improvement which comprises: an annular outer bearing race snugly seated in said housing at said one end of the rotary mechanism, an annular inner bearing race located laterally inward from said outer race and passing said shaft, rolling anti-friction members engaged between said outer and inner races, an end plate rigidly connected to said inner race and snugly receiving said shaft for rotation of the end plate and the inner race in unison with said shaft and the rotary mechanism, said end plate extending from said shaft laterally across said rotary mechanism in substantially sealing engagement with the latter, a stationary liner within said housing surrounding said fluid displacement rotor, said end plate extending completely across said one end of the rotor and into substantially sealing engagement with the corresponding end of the liner, said housing having a laterally inwardly extending portion spaced axially outward from said end of the liner, said outer race being engaged axially between said laterally extending portion of the housing and said end of the liner to define the position of the liner and said rotary mechanism axially of the housing, and an annular spacer extending around the periphery of said end plate and engaged axially between the outer race and said end of the liner, said spacer having an axially inward end face which is substantially coplanar with the axially inward face of said end plate.

References Cited

UNITED STATES PATENTS

| | | | |
|---|---|---|---|
| 1,104,270 | 7/1914 | Pack | 308—187.1 |
| 1,161,465 | 11/1915 | Foley | 308—186 |
| 1,338,091 | 4/1920 | Pearson | 308—186 X |
| 1,928,690 | 10/1933 | Hohnhorst et al. | 308—236 X |
| 2,011,192 | 8/1935 | Comstock | 308—186 X |
| 2,031,994 | 2/1936 | Whitney | 308—186 X |
| 2,051,704 | 8/1936 | Harris | 308—236 |
| 2,617,899 | 11/1952 | Brunk | 200—31 |
| 2,649,337 | 8/1953 | Ware | 308—236 X |
| 2,762,340 | 9/1956 | Roggenburk | 91—121 X |
| 3,054,389 | 9/1962 | Roggenburk | 91—76 |
| 3,035,554 | 5/1962 | Selzler | 91—137 |

MARTIN P. SCHWADRON, Primary Examiner

G. N. BAUM, Assistant Examiner

U.S. Cl. X.R.

91—76, 121; 308—186, 187, 236